Patented Nov. 23, 1926.

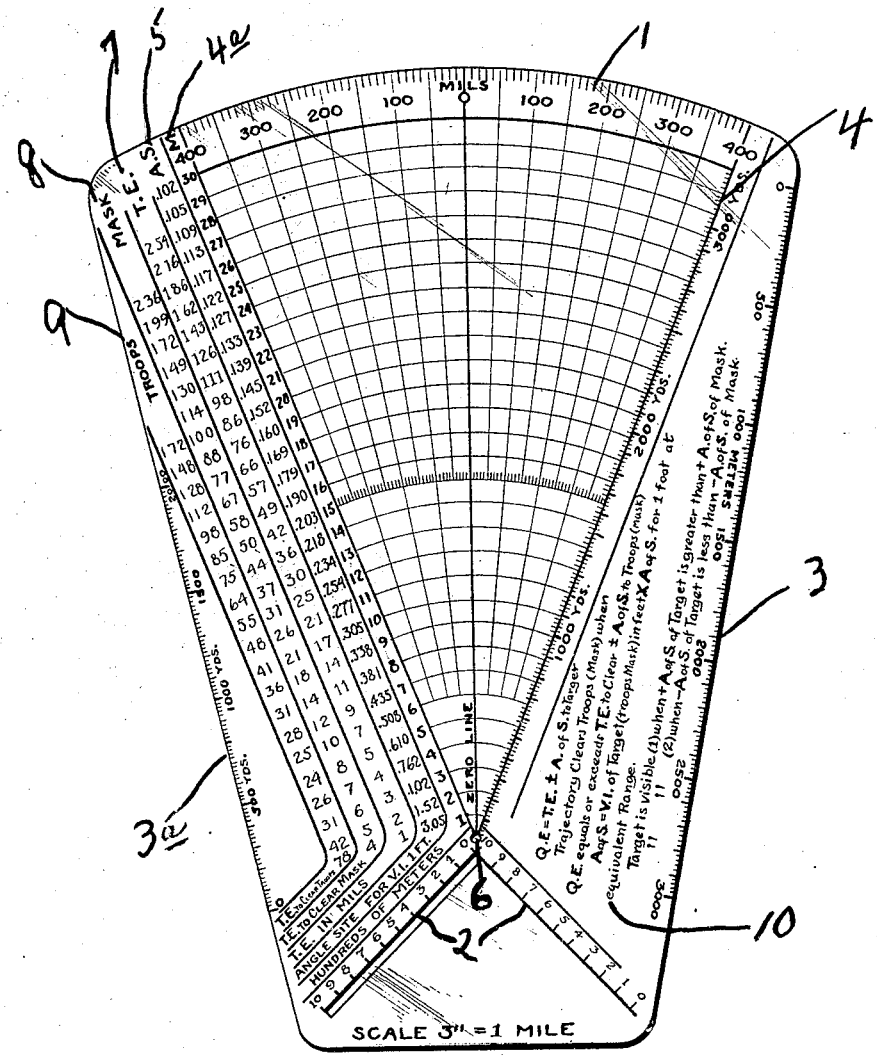

1,608,043

UNITED STATES PATENT OFFICE.

JULIAN C. SMITH, OF WASHINGTON, DISTRICT OF COLUMBIA.

MAP READER AND FIRING-DATA COMPUTER.

Application filed July 14, 1924. Serial No. 726,007.

This invention relates to a map reader and firing data computer and particularly to an instrument of the kind described which is intended for use in connection with the setting of machine guns and artillery, especially for indirect fire and when a map is used for determining positions.

It often happens that the maps used and the sighting and range finding instruments employed have different scales, all calibrated; for example, the map scale may be in yards or feet, while the calibrations of the sighting instruments are mils and range finders often give readings in meters.

In indirect firing computations must be made which are not only based upon the distance, position and elevation of the gun and target but the mask must also be cleared by the projectiles and provision must be made for clearing friendly troops, over whom such fire is often directed. Existing conditions make it imperative that these computations be quickly and accurately made and the necessity for a visible check of the computations precludes the practical use of slide-rule type computing devices.

It is an important object therefore of the present invention to provide an instrument which is adapted to be used in connection with sighting and range finding apparatus and with a military map to quickly obtain necessary data for firing machine guns and artillery.

It is also an important object of this invention to provide an instrument of the kind described which affords easily understandable conversion scales and tables to readily supply properly reduced data from which firing computations may be quickly made.

It is finally an important object of this invention to provide such an instrument which is simple, inexpensive, durable and which may be easily carried in the users' pocket.

Other and further important objects of this invention will be apparent from the disclosures in the specification and accompanying drawings.

The invention (in the preferred form) is illustrated on the drawing and hereinafter more fully described.

On the drawing:

The figure illustrates a plan view of an instrument embodying the present invention.

As shown on the drawing:

The instrument of this invention is constructed of a sheet of suitable transparent material such as celluloid or the like which is trapezoidal in form and which has one arcuate edge with a mil protractor or angular measurement scale 1 marked thereon. This arcuate edge forms the base of the trapezoid and marked on the sheet, near the top of the trapezoid is a right angle scale or square 2 which may be used in determining map positions from given co-ordinates in a manner which is well known.

The various tables marked on this instrument are ordinarily calibrated to a usual military map scale of three inches to one mile and marked on the straight edge 3 of the instrument, which forms one side of the trapezoid is a metric scale for the reading or measurement of distances in meters.

On the opposite side $3^a$ of the sheet is marked a scale in yards. Conversion scales 4 and $4^a$ are also provided on the instrument as indicated, being connected by arcuate lines so that ready conversions from the English system of linear measurement to the metric system of linear measurement may be graphically made by the use of this instrument and without the necessity of computation.

Parallel to table $4^a$ of metric distances there is marked on the instrument a table 5 of conversion factors for determining the angle of site for vertical intervals, that is the vertical distance or elevation between two points, is expressed in feet, and the ranges or distances between the points are expressed in meters.

Adjacent the table 5 is a table 7 giving the tangent elevation in mils for any given range, this tangent elevation being defined as the vertical angle between axis of the bore of the horizontal plane.

Marked on the sheet adjacent the table 7 and outside the same is a table 8 which gives the tangent elevation in mils necessary to clear the mask, an object or feature of terrain which prevents the gunner from seeing the target. The proper reading from this table is determined from the corresponding range from table 4ª.

A table 9 which is marked on the sheet adjacent the table 8 contains data giving the proper tangent elevation to be used in clearing friendly troops positioned in advance of the guns. The proper reading from this table is, of course, determined by ascertaining the distance from the guns to the troops and reading in table 9 the figure opposite this distance as expressed in table 4ª.

The sheet is usually perforated as indicated at 6 to permit of the insertion of a sharp instrument therethrough so that the sheet may be pinned at this point to the map at a position corresponding to the position of the directing or left hand gun of the battery. The instrument has marked thereon at 10 a table giving important formulae to be used in the computation of firing data from data that is taken from the tables on the instrument. The instrument of this invention is particularly valuable since it readily provides the desired data without the necessity of long computations and at the same time permits of longhand computation of the essential features to be determined in the setting of the guns of the battery, thus permitting of a visible check on all operations.

Since the use of this instrument will be readily apparent to those skilled in the art, it is not thought necessary to give examples of problems to be worked out herein.

The instrument is durable and inexpensive and the shape in which it is made is such that it may be readily carried in the pocket of the user and easily withdrawn from the pocket of the user when needed.

I am aware that numerous details of construction may be varied through a wide range without departing from the principles of this invention, and I therefore do not purpose limiting the patent granted otherwise than necessitated by the prior art.

I claim as my invention:

1. In an instrument of the class described, a range table, linear conversion scale and tabulated data adjacent the range table from which a gun setting for a variety of conditions existing at intermediate ranges may be computed.

2. In an instrument of the class described, a vertically arranged range table and a plurality of tables adjacent and parallel to the range table bearing data from which a gun setting for a variety of conditions existing at intermediate ranges may be computed.

3. In an instrument of the class described, tabulated data from which vertical angular gun settings may be computed and a scale whereby the necessary lateral angular gun movement may be determined.

4. In an instrument comprising a sheet of transparent material of trapezoidal form, having one arcuate edge, an angular measurement scale and linear measurement scales marked on the sheet permitting of graphic conversions from metric to English linear measurements, and tabulated data for computing vertical gun settings marked on the sheet between said last mentioned scales.

In testimony whereof I have hereunto subscribed my name.

JULIAN C. SMITH.